US008970426B1

(12) United States Patent
Stockmann et al.

(10) Patent No.: US 8,970,426 B1
(45) Date of Patent: Mar. 3, 2015

(54) AUTOMATIC MATCHED DOPPLER FILTER SELECTION

(71) Applicant: Lockheed Martin Corporation, Bethesda, MD (US)

(72) Inventors: Peter H. Stockmann, Jamesville, NY (US); David M. Mittiga, Manlius, NY (US)

(73) Assignee: Lockheed Martin Cproration, Bethesda, MD (US)

( * ) Notice: Subject to any disclaimer, the term of this patent is extended or adjusted under 35 U.S.C. 154(b) by 245 days.

(21) Appl. No.: 13/678,045

(22) Filed: Nov. 15, 2012

(51) Int. Cl.
*G01S 13/00* (2006.01)
*G01S 7/292* (2006.01)

(52) U.S. Cl.
CPC .................... *G01S 7/292* (2013.01)
USPC ............................ 342/159; 342/192; 342/195

(58) Field of Classification Search
USPC .......................................................... 342/159
See application file for complete search history.

(56) References Cited

U.S. PATENT DOCUMENTS

| 3,444,557 | A | 5/1969 | Calhoon, Sr. et al. |
| 3,990,076 | A | 11/1976 | Naidich |
| 4,137,532 | A | 1/1979 | Taylor, Jr. et al. |
| 4,339,754 | A | 7/1982 | Hammers et al. |
| 4,496,949 | A | 1/1985 | Bettini et al. |
| 4,616,229 | A | 10/1986 | Taylor, Jr. |
| 4,709,236 | A | 11/1987 | Taylor, Jr. |
| 7,741,992 | B2 | 6/2010 | Wang et al. |
| 7,903,024 | B2 | 3/2011 | Tietjen et al. |
| 2009/0096662 | A1* | 4/2009 | Wang et al. .................... 342/93 |
| 2010/0073218 | A1 | 3/2010 | Stockmann |

OTHER PUBLICATIONS

United States statutory invention registration No. H14, 1 page, Jan. 7, 1986.

* cited by examiner

*Primary Examiner* — Timothy A Brainard
(74) *Attorney, Agent, or Firm* — Howard IP Law Group, PC

(57) ABSTRACT

A system for suppressing clutter in a radar system is provided. The system includes an antenna configured to receive radar signals containing clutter and a digital receiver adapted to convert the radar signals received by the radar arrays to complex I/Q samples. These I/Q samples are provided to a Doppler filter bank comprising a plurality of Doppler filters for filtering the pulse compressed data into Doppler bins representative of range values according to Doppler frequency. The system further includes at least one processor for comparing the output of each of the plurality of Doppler filters types to respective background clutter maps, and identifying the Doppler filter which outputs the radar return signal with the greatest magnitude over the clutter map. Once identified, target detection operations may be performed on the output of the identified Doppler filter.

13 Claims, 3 Drawing Sheets

AUTOMATIC MATCHED DOPPLER FILTER SELECTION

FIELD OF THE INVENTION

The present invention relates to signal processing systems and methods for use in radar applications, and more particularly, to systems and methods for processing radar returns in a pulse-Doppler radar system.

BACKGROUND

Radar systems used to detect the presence, position, and other characteristics of both natural and man-made objects are critical to both civilian and military operations. These systems typically transmit "beams" or electromagnetic (EM) signals toward targets, and process reflected return signals (or echoes) for object identification and characterization. A radar echo return usually contains both signals generated from a target, as well as background clutter. The clutter signal arises from reflections from stationary and slow-moving background objects (rain, land, etc.), and is usually stronger than the target signal. This clutter decreases radar performance by hindering the system's ability to detect targets and/or increases the probability of a false target detection.

Numerous method exist which attempt to discriminate between unwanted clutter and target return signals. Many of these clutter cancellation methods rely on the principle that moving targets have a Doppler frequency shift, while stationary targets do not. Thus, pulse-Doppler radar systems may implement a plurality of Doppler frequency filters (e.g. FFT networks) used to divide the Doppler frequency space into many narrow regions, with each filter corresponding to one of these frequency bands. Knowing the frequency space normally associated with specific clutter types, these Doppler filters can be used to discriminate against clutter, as well as identify target Doppler frequency.

As presently implemented, these systems comprise a plurality of selectable Doppler filter banks, wherein each bank has a series of Doppler filters configured for a specific type of clutter (e.g. weather clutter, ground clutter, "folded over" clutter). A bank selection process may be implemented such that, for example, if a scan area is determined to comprise heavy ground clutter, a single filter bank suited (i.e. matched) for this clutter type will be selected for processing radar returns. In addition to requiring redundant filters found in more than one filter bank (each bank must cover the entire Doppler window), these systems must utilize bank switching controls and associated algorithms which are often difficult to implement and require continuous monitoring of a clutter map to drive the bank switching. Moreover, these bank switching arrangements often do not select the optimum filter bank from a performance perspective.

Accordingly, improved methods of processing return signals in a pulse-Doppler radar system are desired.

SUMMARY

In one embodiment of the present disclosure, a system for suppressing clutter in a radar system is provided. The system includes an antenna configured to receive radar signals containing clutter and a digital receiver adapted to convert the radar signals received by the radar to complex I/Q samples. These I/Q samples are provided to a single Doppler filter bank having a plurality of Doppler filters for filtering the pulse compressed data into Doppler bins representative of range values according to Doppler frequency. The system further includes at least one processor for at least 1) comparing the output of each of the plurality of Doppler filters to a respective background clutter map, and 2) identifying the Doppler filter which outputs the radar return signal with the greatest magnitude across frequency and filter type over the clutter map. Once identified, target detection operations may be performed on the output of the identified Doppler filter.

According to another embodiment of the present disclosure, a method for suppressing clutter when detecting objects of interest in a detection system is provided. The method includes the steps of transmitting at least one electromagnetic signal, receiving reflected return signals from the transmitted signal, and Doppler filtering the return signals in a single Doppler filter bank having a plurality of Doppler filters. The output of each of the Doppler filters is compared to a respective background clutter map, and the Doppler filter which outputs the radar return signal with the greatest magnitude over its respective clutter map is identified and selected. Target detection processing is performed on the output of the selected Doppler filter.

DETAILED DESCRIPTION

Figure 1:
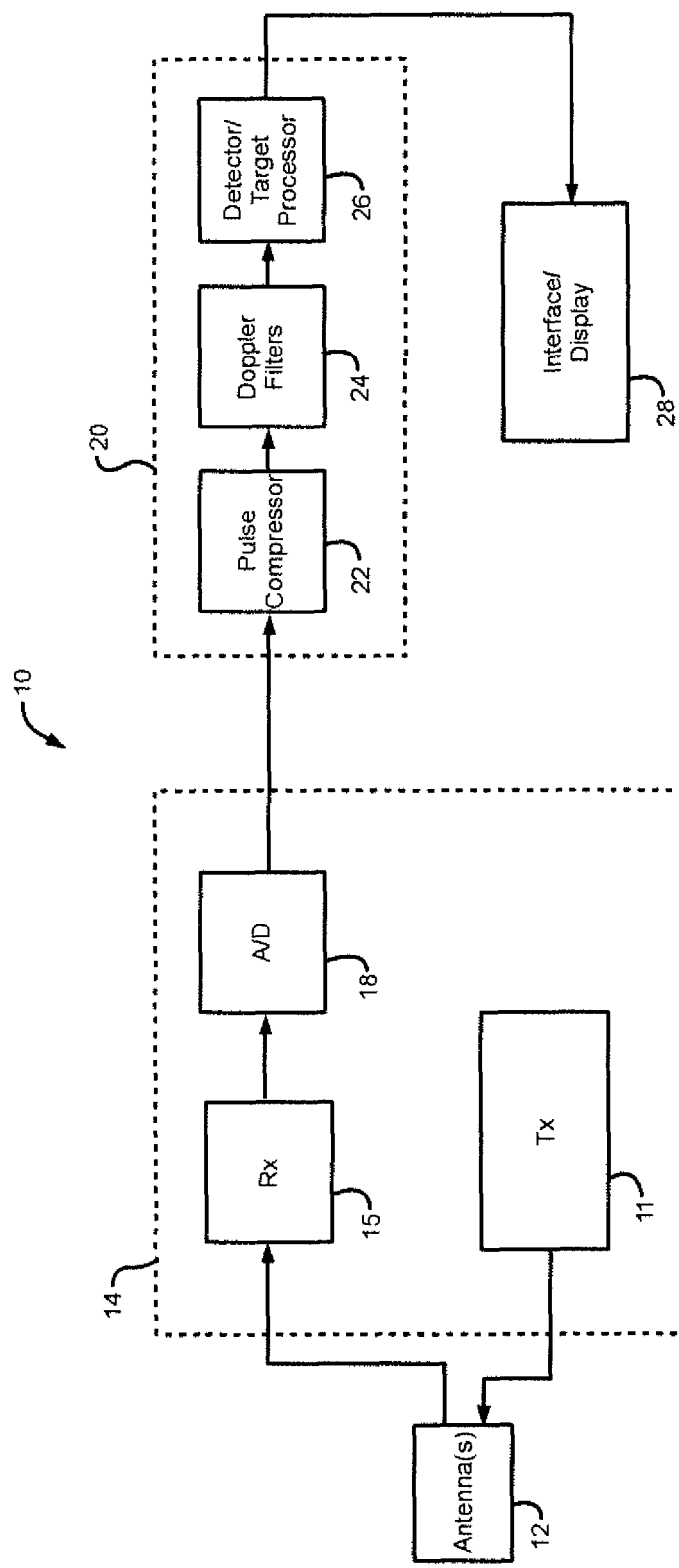
FIG. 1 is a simplified block diagram of a radar system useful for describing embodiments of the present disclosure.

It is to be understood that the figures and descriptions of the present invention have been simplified to illustrate elements that are relevant for a clear understanding of the present invention, while eliminating, for purposes of clarity, many other elements found in typical remote sensing systems, such as pulse and pulse-Doppler radar systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

As set forth above, pulse-Doppler radar systems of the prior art comprise a plurality of Doppler filter banks, with each bank having a plurality of Doppler filters and configured to effectively process radar returns in differing environmental conditions. Embodiments of the present disclosure aim to improve on these systems by providing a pulse-Doppler radar system that consists of a single Doppler filter bank containing a plurality of matched Doppler filters suitable for reducing clutter from a variety of sources. Each of these filters in the single Doppler filter bank of the present disclosure is used to process concurrently return signals and generate a respective clutter map. A "greatest of" operation is performed across each of the filters in the single filter bank in order to identify which particular Doppler filter comprises the greatest return above its respective clutter map (i.e. identify the filter comprising the greatest signal/clutter map ratio). This signal to clutter map ratio can be measured for each Doppler filter in each resolution cell. A detection scheme may be implemented, wherein, for example, constant false alarm rate (CFAR) thresholding and detection operations are performed on the output of the filter which has the greatest signal to clutter map ratio.

Referring generally to FIG. 1, embodiments of the present invention will be described herein as implemented into an exemplary pulse-Doppler radar system. As will be understood by one of ordinary skill in the art, a pulse-Doppler system 10 may comprise a front-end module 14, including a transmitter 11 for providing a series of defined pulses from an antenna 12. Return signals from each pulse are subsequently captured by antenna 12 and provided to at least one receiver 15 for signal modulation. Receiver 15 may include various processing components, such as one or more filters, a low-noise amplifier and a down converter, as will be understood by one of ordinary skill in the art. At least one analog to digital converter (ADC) 18 is provided for converting received analog return signals to digital form.

System 10 may also include, by way of non-limiting example, a digital processing system 20, including a pulse compression module 22 operative to receive post-ND digitized in-phase and quadrature-phase (I/Q) signal data from front end module 14. As will be understood by one of ordinary skill in the art, pulse compression techniques may be implemented to achieve high range resolution without the need for high-powered antennas. Pulse compression may be accomplished by various filtering and/or line delay arrangements. For example, pulse compression may be achieved by applying a Fast Fourier Transform (FFT) to a received time-domain signal, thereby converting the data to the frequency domain. A weighting factor, or pulse compression weight (e.g. in the form of a vector-matrix) is applied in the frequency domain. An inverse FFT (IFFT) is applied to return the data streams to the time-domain. The output of pulse compression module 22 comprises modulated data which may be subject to further processing, such as sampling the incoming data into range cells or bins, generating one sample in each range bin for each pulse. Range bin data is provided to Doppler filters 24, generating a series of Doppler bins for each range cell. Data from a particular Doppler bin corresponds to a signal from a target or background, at a given range, moving at a particular speed.

As set forth above, Doppler filters are typically have been implemented to be part of a plurality of selectable Doppler filter banks, wherein each bank of Doppler filters is configured for a specific type of clutter. A bank switching process is utilized for continuous monitoring of a clutter map as the basis for determining an optimum bank. Once Doppler-filtered, return data is provided to a detection processor 26 operative to, for example, perform a target detection process against a time-averaged background map. The results of this detection processing may be provided to a display device 28 for end-user interfacing.

Figure 2:
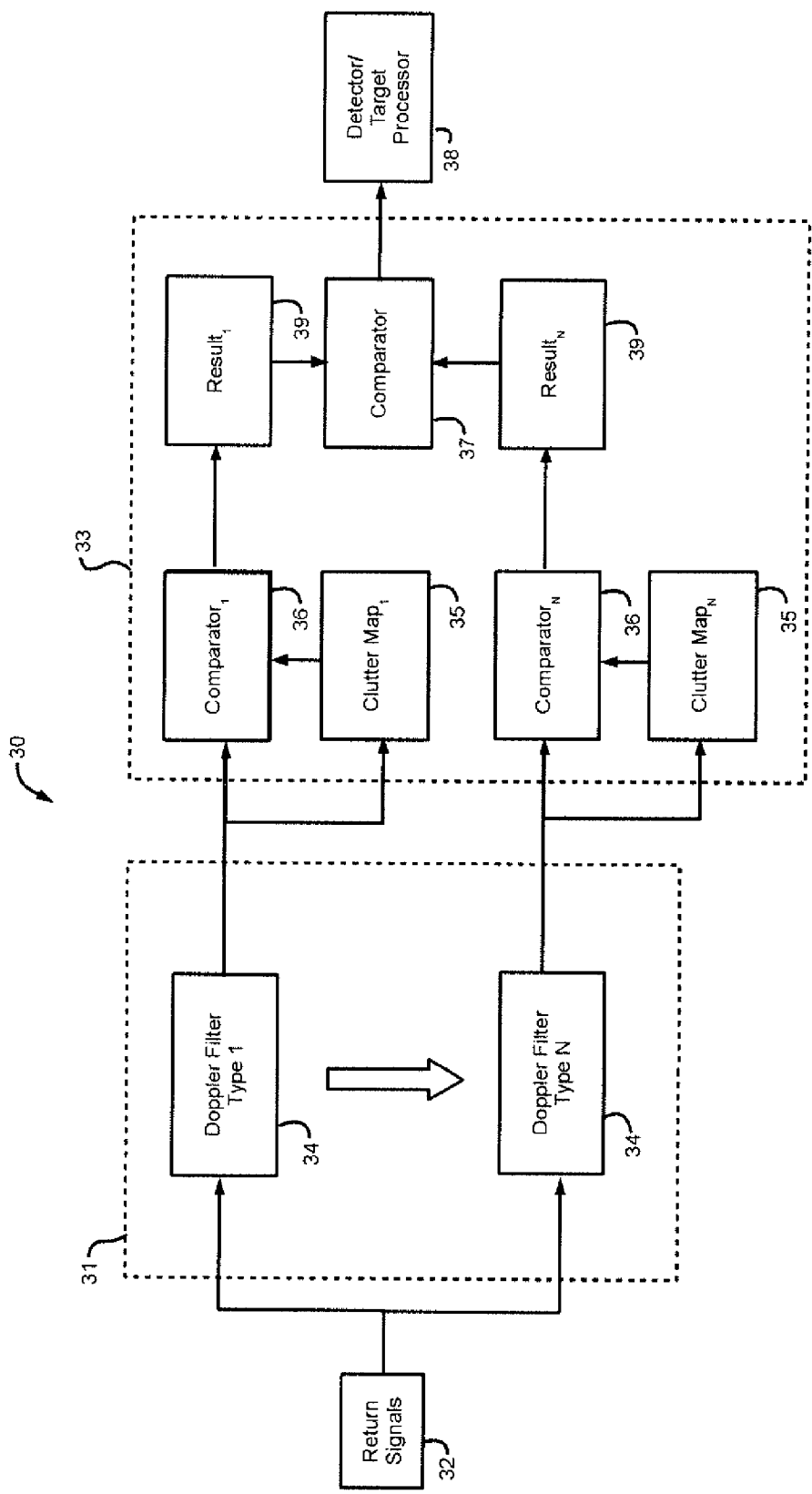
FIG. 2 is a simplified partial block diagram of a radar processing system according to an embodiment of the present disclosure.

Referring generally to FIG. 2, an exemplary signal processing and target detection system 30 according to an embodiment of the present disclosure is shown. System 30 may be implemented in, for example, a pulse-Doppler radar system such as that described above with respect to FIG. 1. Return signals 32 (e.g. digitized return data from front-end module 14 of FIG. 1) are provided to each of a plurality of Doppler filters 34 of types 1-N of a single Doppler filter bank 31. Each of these filters types, or sub-groups thereof, may be matched for a particular type of environmental condition, and thus, a particular type of clutter. The output of each of Doppler filters 34 is provided to a computer processing system 33.

Processing system 33 is operative to create a corresponding time-average clutter map 35 from the output of each Doppler filter 34, including a separate map for every range/azimuth/Doppler bin. Processing system 33 may also comprise one or more processors, embodied herein as comparators 36, for receiving the real-time outputs of each of Doppler filters 34. Comparators 36 are configured to compare the magnitude of each received return signal to a respective clutter map 35, thus determining a signal/clutter map ratio for the output of each Doppler filter 34. Another processor or comparator 37 is provided for performing a "greatest of" operation, wherein the Doppler filter output comprising the highest signal/clutter map ratio is identified.

Unlike the prior art, the greatest of operation is across Doppler frequency and clutter filter type. It is to be understood that because this greatest of operation is applied across all filters that constitute the single filter bank, and hence across all filter types, it replaces the long standing bank switching of the prior art. Thus, while embodiments of the present disclosure may increase the number of filters included in a bank over the prior art, bank switching complexity is eliminated and the filter type selection is achieved in an optimal manner via the greatest of operation across matched filters to different clutter types.

The output of the Doppler filter selected based on the greatest of operation may be provided to a detection processor 38 for identifying potential targets. Target detection may be performed by any number of means, including CFAR thresholding techniques. As will be understood by one of ordinary skill in the art, CFAR processing attempts to determine a threshold power above which any return can be considered to originate from a target. This threshold is set typically to achieve a desired probability of a false alarm, or false alarm rate.

Embodiments of the present disclosure include a single Doppler filter bank 31 populated with a variety of Doppler filters 34 matched for a variety of clutter types. Exemplary fundamental Doppler filters which may be implemented into a single Doppler filter bank according to embodiments of the present disclosure include:

(1) lightly weighted but heavily nulled Doppler filters for strong ground clutter with no fill pulses;

(2) lightly weighted but heavily nulled Doppler filters for folded over strong ground clutter with one or more fill pulses;

(3) heavily weighted but lightly nulled Doppler filters for weather with no fill pulses;

(4) heavily weighted but lightly nulled Doppler filters for weather with one or more fill pulses;

(5) super clutter Doppler filters for detecting very low Doppler targets that are stronger than the ground clutter.

By way of example, a radar system utilizing 10 pulse bursts is considered. A conventional Doppler filter bank for a system using ten (10) pulses may comprise 10 filters, where these filters are configured to address only one type of clutter, for example, weather clutter. Thus, the prior art provides multiple banks (each comprising approximately 10 filters), and is selectively implemented to process signals containing different clutter types at different range/azimuth locations.

In one exemplary embodiment of the present disclosure, these multiple banks are replaced with a single filter bank constituted by the following 34 Doppler filters configured to process different types of clutter:

| Number of filters | Filter type | Description of filters | Frequency extent of filters | Description of function |
|---|---|---|---|---|
| 3 | Super clutter | Tuned to minus very low, zero and positive very low Doppler | Low Doppler region | Detection of very low Doppler targets and targets at blind velocities |
| 3 | AP Super clutter | Tuned to minus very low, zero and positive very low Doppler (first pulse not used) | Low Doppler region | Detection of very low Doppler targets and targets at blind velocities, both folded over in range by anomalous propagation |
| 7 | Ground clutter | Deep null at zero Doppler and modest weighting | Full Doppler window | Detection of targets at velocity across the Doppler span and cancellation of ground clutter |
| 7 | AP ground clutter | Deep null at zero Doppler and modest weighting (first pulse not used) | Full Doppler window | Detection of targets at velocity across the Doppler span and cancellation of ground clutter folded over in range by anomalous propagation |
| 7 | Weather clutter | Modest null at zero but heavy weighting | Full Doppler window | Detection of targets at velocity across the Doppler span and suppression of weather via low Doppler sidelobes |
| 7 | AP weather clutter | Modest null at zero but heavy weighting (first pulse not used) | Full Doppler window | Detection of targets at velocity across the Doppler span and suppression of weather folded over in range by anomalous propagation via low Doppler sidelobes |

As there is some redundancy in covering the Doppler span when different filters are used simultaneously, however, the above filter bank may be further optimized and implemented with a reduced number of filters (e.g. 26) while maintaining adequate Doppler coverage, as shown in the following table:

| Number of filters | Filter type | Description of filters | Frequency extent of filters | Description of function |
|---|---|---|---|---|
| 3 | Super clutter | Tuned to minus very low, zero and positive very low Doppler | Low Doppler region | Detection of very low Doppler targets and targets at blind velocities |
| 3 | AP Super clutter | Tuned to minus very low, zero and positive very low Doppler (first pulse not used) | Low Doppler region | Detection of very low Doppler targets and targets at blind velocities, both folded over in range by anomalous propagation |
| 5 | Ground clutter | Deep null at zero Doppler and modest weighting | Full Doppler window | Detection of targets at velocity across the Doppler span and cancellation of ground clutter |
| 5 | AP ground clutter | Deep null at zero Doppler and modest weighting (first pulse not used) | Full Doppler window | Detection of targets at velocity across the Doppler span and cancellation of ground clutter folded over in range by anomalous propagation |
| 5 | Weather clutter | Modest null at zero but heavy weighting | Full Doppler window | Detection of targets at velocity across the Doppler span and suppression of weather via low Doppler sidelobes |
| 5 | AP weather clutter | Modest null at zero but heavy weighting (first pulse not used) | Full Doppler window | Detection of targets at velocity across the Doppler span and suppression of weather folded over in range by anomalous propagation via low Doppler sidelobes |

Thus, embodiments of the present invention may provide the benefit of reducing the number of Doppler filters required by a processing system by eliminating common filters typically found in the separate filter banks of the prior art. Further, as the filter bank as a whole contains filters for each type of clutter at all Doppler frequencies, no filter bank selection process and its associated bank switching processors and algorithms are required, as compared to systems of the prior art. Additionally, by sacrificing straddling loss, one can further reduce the number of filters and still achieve nearly the same performance as each original bank. Moreover, the "greatest of" operation performed by embodiments of the present disclosure comprises an instantaneous and efficient process to identify the particular filter which provides optimized operation of the system at every range/azimuth location.

Figure 3:
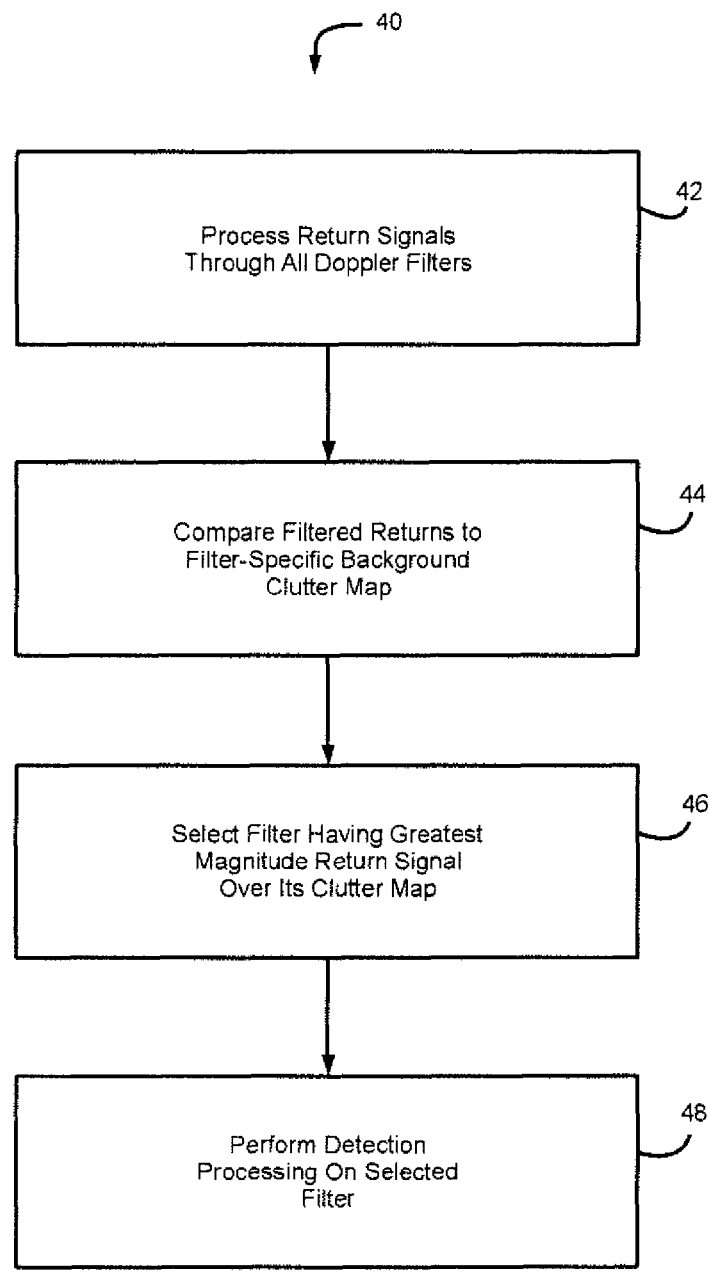
FIG. 3 is a process flow diagram illustrating an exemplary radar processing method according to an embodiment of the present disclosure.

FIG. 3 is a process flow diagram illustrating an exemplary signal processing method 40 according to the present disclosure. As set forth above, embodiments of the present disclosure include processing of pulse-Doppler radar return signals through each of a plurality of Doppler filters of a single Doppler filter bank (step 42). In step 44, these filtered return signals are compared to a respective clutter map, wherein the magnitude of the return signal above the clutter map, or signal/clutter ratio, is determined for each filter. Thus, the results of these comparisons will be a magnitude above the clutter map for each of the plurality of Doppler filters. In step 46, the filter having the greatest return above the clutter map is selected, and provided to a target detection processor used to, for example, identify targets using CFAR techniques in step 48.

The embodiments are provided by way of example only, and other embodiments for implementing the methods described herein may be contemplated by one of skill in the pertinent art without departing from the intended scope of this disclosure. For example, processing systems described herein may include memory containing data, which may include instructions, the instructions when executed by a processor or multiple processors, cause the steps of a method for performing the operations set forth herein. Software may be embodied in a non-transitory machine readable medium upon which software instructions may be stored, the stored instructions when executed by a processor cause the processor to perform the steps of the methods described herein. Any suitable machine readable medium may be used, including but not limited to, magnetic or optical disks, for example CD-ROM, DVD-ROM, floppy disks and the like. Other media also fall within the intended scope of this disclosure, for example, dynamic random access memory (DRAM), random access memory (RAM), read-only memory (ROM) or flash memory may also be used.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A system for suppressing clutter when detecting objects of interest, comprising:
    an antenna configured to receive radar signals containing clutter;
    a digital receiver adapted to convert the received analog radar signals to complex digital received data;
    a single Doppler filter bank constituted by a plurality of Doppler filters matched to various clutter types for filtering the received data into Doppler bins representative of range values according to Doppler frequency and clutter type;
    at least one processor configured to:
        compare the output of each of the plurality of Doppler filters to a respective background clutter map;
        based on said comparison, identify the Doppler filter whose radar return signal output has the greatest magnitude across frequency and filter type over the clutter map; and
        perform target detection of objects of interest on the output of the identified Doppler filter.

2. The system of claim 1, wherein the processor utilizes only the single Doppler filter bank for filtering the received data for at least weather type clutter and ground type clutter.

3. The system of claim 1, wherein processing is performed simultaneously without bank switching.

4. The system of claim 1, wherein the at least one processor identifies the Doppler filter which outputs the radar return signal with the greatest magnitude for every one of a range, azimuth and Doppler bin.

5. The system of claim 1, wherein the plurality of Doppler filters of the single Doppler filter bank include Doppler filters matched to at least ground type clutter and weather type clutter.

6. The system of claim 1, wherein the plurality of Doppler filters of the single Doppler filter bank include at least fill pulse filters and no fill pulse filters.

7. The system of claim 1, wherein the at least one processor automatically identifies the Doppler filter optimized for cancelling clutter contained in the radar return signal at every range and azimuth location.

8. A method for suppressing clutter when detecting objects of interest in a detection system comprising:
    transmitting at least one electromagnetic signals;
    receiving reflected return signals from the transmitted signal;
    Doppler filtering the return signals in a single Doppler filter bank comprising a plurality of Doppler filters matched to various clutter types;
    comparing the output of each of the plurality of Doppler filters to a respective background clutter map;
    identifying the Doppler filter which outputs the radar return signal with the greatest magnitude across frequency and filter type over the clutter map; and
    performing target detection on the output of the identified Doppler filter.

9. The method of claim 8, wherein only the single Doppler filter bank is used for filtering the received data for at least ground type clutter and weather type clutter.

10. The method of claim 8, wherein the step of identifying the Doppler filter comprises identifying the Doppler filter which outputs the radar return signal with the greatest magnitude for every one of a range, azimuth and Doppler bin.

11. The method of claim 8, wherein the plurality of Doppler filters of the single Doppler filter bank include Doppler filters matched to at least ground type clutter and weather type clutter.

12. The method of claim 8, wherein the plurality of Doppler filters of the single Doppler filter bank includes fill pulse filters and no fill pulse filters.

13. The method of claim 8, wherein the at least one processor automatically identifies the Doppler filter optimized for cancelling clutter contained in the radar return signal at every range and azimuth location.

* * * * *